(12) United States Patent
Sugita et al.

(10) Patent No.: US 8,153,333 B2
(45) Date of Patent: Apr. 10, 2012

(54) FUEL CELL WITH PROTRUDED GAS DIFFUSION LAYER

(75) Inventors: Narutoshi Sugita, Utsunomiya (JP); Katsuhiko Kohyama, Tsurugashima (JP); Shuhei Goto, Utsunomiya (JP); Hiroshi Shinkai, Utsunomiya (JP); Hiroyuki Tanaka, Utsunomiya (JP); Takaki Nakagawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 837 days.

(21) Appl. No.: 10/558,229

(22) PCT Filed: May 21, 2004

(86) PCT No.: PCT/JP2004/006971
§ 371 (c)(1),
(2), (4) Date: Nov. 22, 2005

(87) PCT Pub. No.: WO2004/105167
PCT Pub. Date: Dec. 2, 2004

(65) Prior Publication Data
US 2007/0020504 A1    Jan. 25, 2007

(30) Foreign Application Priority Data
May 23, 2003    (JP) ................................ 2003-146288

(51) Int. Cl.
*H01M 4/02*    (2006.01)
*H01M 4/36*    (2006.01)
*H01M 8/10*    (2006.01)

(52) U.S. Cl. .................... 429/534; 429/480; 429/523

(58) Field of Classification Search .............. 429/12–46, 429/452, 545–458, 460, 463, 465, 467–469, 429/471, 512–514, 523, 534–535, 456–457, 429/480, 482–483
See application file for complete search history.

(56) References Cited

U.S. PATENT DOCUMENTS
6,280,870 B1 * 8/2001 Eisman et al. .................. 429/34
(Continued)

FOREIGN PATENT DOCUMENTS
JP    60-000066    1/1985
(Continued)

OTHER PUBLICATIONS

Width entry, The American Heritage® Dictionary of the English Language, 2007, [online], [retrieved on Dec. 8, 2009], Retrieved from Credoreference using Internet <URL: http://www.credoreference.com/entry/hmdictenglang/width>.*

(Continued)

*Primary Examiner* — Barbara Gilliam
*Assistant Examiner* — Claire L Roe
(74) *Attorney, Agent, or Firm* — Nelson Mullins Riley & Scarborough LLP; Anthony A. Laurentano

(57) ABSTRACT

An assembling operation of a fuel cell is effectively simplified. With the simple and economical structure, the desired sealing function is achieved. The fuel cell includes a membrane electrode assembly and first and second metal separators sandwiching the membrane electrode assembly. Connection channels are provided on the first metal separator. The connection channels connect the oxygen-containing gas supply passage and the oxygen-containing gas discharge passage to the oxygen-containing gas flow field. The membrane electrode assembly has first overlapping portions overlapped on the connection channels for sealing the connection channels. The first overlapping portions comprise, in effect, a gas diffusion layer.

8 Claims, 13 Drawing Sheets

U.S. PATENT DOCUMENTS

| | | |
|---|---|---|
| 6,692,860 B2 | 2/2004 | Inoue et al. |
| 6,761,991 B2 * | 7/2004 | Frisch et al. .................. 429/469 |
| 6,783,883 B1 * | 8/2004 | Koschany ....................... 429/36 |
| 2001/0005557 A1 | 6/2001 | Yosida et al. |
| 2002/0117780 A1 * | 8/2002 | Inoue et al. .................. 264/299 |

FOREIGN PATENT DOCUMENTS

| | | |
|---|---|---|
| JP | 5-66877 | 9/1993 |
| JP | 2001-266910 | 9/2001 |
| JP | 2001-266911 | 9/2001 |
| JP | 2002-25587 | 1/2002 |
| JP | 2002-231264 | 8/2002 |
| JP | 2003-132905 | 5/2003 |
| JP | 2004-207074 | 7/2004 |
| WO | 02/25753 A1 | 3/2002 |

OTHER PUBLICATIONS

European Office Action for Application No. 04745282.6, dated Jul. 1, 2010.

* cited by examiner

FUEL CELL WITH PROTRUDED GAS DIFFUSION LAYER

RELATED APPLICATIONS

This application is a 35 U.S.C. 371 national stage filing of International Application No. PCT/JP2004/006971, filed 21 May 2004, which claims priority to Japanese Patent Application No. 2003-146288 filed on 23 May 2003 in Japan. The contents of the aforementioned applications are hereby incorporated by reference.

TECHNICAL FIELD

The present invention relates to an internal manifold type fuel cell formed by stacking an electrolyte electrode assembly and separators in a stacking direction. The electrolyte electrode assembly includes a pair of electrodes and an electrolyte interposed between the electrodes. Reactant gas flow fields for supplying reactant gases along surfaces of the electrodes are formed between the electrolyte electrode assembly and the separators. Reactant gas passages are connected to the reactant gas flow fields, and extending through the fuel cell in the stacking direction.

BACKGROUND ART

For example, a solid polymer fuel cell includes an electrolyte electrode assembly (membrane electrode assembly), and separators sandwiching the electrolyte electrode assembly. The electrolyte electrode assembly includes an anode, a cathode, and an electrolyte membrane interposed between the anode and the cathode. The electrolyte membrane is a polymer ion exchange membrane. In this type of the fuel cell, in use, predetermined numbers of the electrolyte electrode assemblies and the separators are stacked together to form a fuel cell stack.

In the fuel cell, a fuel gas such as a gas chiefly containing hydrogen (hereinafter also referred to as the "hydrogen-containing gas") is supplied to the anode. The catalyst of the anode induces a chemical reaction of the fuel gas to split the hydrogen molecule into hydrogen ions and electrons. The hydrogen ions move toward the cathode through the electrolyte, and the electrons flow through an external circuit to the cathode, creating a DC electrical energy. A gas chiefly containing oxygen or air (hereinafter also referred to as the "oxygen-containing gas") is supplied to the cathode. At the cathode, the hydrogen ions from the anode combine with the electrons and oxygen to produce water.

In the fuel cell, a fuel gas flow field (reactant gas flow field) is provided in a surface of the separator facing the anode for allowing the fuel gas (reactant gas) to flow along the separator, and an oxygen-containing gas flow field (reactant gas flow field) is provided in a surface of the separator facing the cathode for allowing the oxygen-containing gas (reactant gas) to flow along the surface of the separator. Further, a fuel gas supply passage and a fuel gas discharge passage as reactant gas passages connected to the fuel gas flow field, and an oxygen-containing gas supply passage and an oxygen-containing gas discharge passage as reactant gas passages connected to the oxygen-containing gas flow field are provided in the marginal region of the separators. The reactant gas passages extend through the separators in the stacking direction.

In this case, the reactant gas flow field is connected to the reactant gas passages through connection channels having parallel grooves or the like for allowing the reactant gases to flow smoothly and uniformly. However, when the separators and the membrane electrode assembly are tightened together such that seal members are interposed between the separators and the membrane electrode assembly, the seal members may be positioned inside the connection channels, and the desired sealing performance cannot be maintained. Further, the reactant gases do not flow suitably.

In an attempt to address the problem, in a solid polymer fuel cell stack disclosed in Japanese Laid-Open Patent Publication No. 2001-266911, as shown in FIG. 13, a reactant gas flow field such as an oxygen-containing gas flow field 2 in a serpentine pattern is formed in a surface of a separator 1. The oxygen-containing gas flow field 2 is connected to an oxygen-containing gas supply through hole 3 and an oxygen-containing gas discharge through hole 4 extending through marginal regions of the separator 1 in the stacking direction. A packing 5 is provided at the separator 1. The packing 5 allows the oxygen-containing gas to flow between the through holes 3 and 4 and the oxygen-containing gas flow field 2, while sealing the other through holes to prevent the leakage.

SUS (Stainless steel) plates 7 as seal members are provided at the connection channels 6a, 6b connecting the through holes 3, 4 and the oxygen-containing gas flow field 2 to cover the connection channels 6a, 6b. Each of the SUS plates 7 has a rectangular shape, and includes ears 7a, 7b at two positions. The ears 7a, 7b are fitted to steps 8 formed on the separator 1.

As described above, according to the disclosure of Japanese Laid-Open Patent Publication No. 2001-266911, the SUS plates 7 as the seal members cover the connection channels 6a, 6b. Therefore, the polymer membrane (not shown) and the packing 5 do not fall into the oxygen-containing gas flow field 2, and the desired sealing performance is achieved. It is possible to prevent the increase in the pressure loss of the reactant gas.

However, in Japanese Laid-Open Patent Publication No. 2001-266911, the SUS plates 7 are attached to the respective connection channels 6a, 6b of the separator 1, and the operation of attaching the SUS plates 7 is laborious. In particular, in the case where several tens to several hundreds of fuel cells are stacked together, the attachment operation of the SUS plates 7 is significantly laborious, and time consuming. The cost for the operation is very large.

Further, since the SUS plates 7 are attached to the connection channels 6a, 6b to cover the connection channels 6a, 6b, the size of the connection channels 6a, 6b cannot be smaller than the width of the SUS plates 7. Thus, it is difficult to achieve reduction in the overall size and weight of the fuel cell.

Patent Document 1: Japanese Laid-Open Patent Publication No. 2001-266911

DISCLOSURE OF THE INVENTION

Problems to be Solved by the Invention

The present invention solves these types of problems, and an object of the present invention is to provide a fuel cell which makes it possible to effectively simplify the assembling operation of the fuel cell, and to achieve the desired sealing function with the economical and simple structure.

Means For Solving the Problems

In the present invention, a fuel cell is formed by stacking an electrolyte electrode assembly and separators in a stacking direction. The electrolyte electrode assembly includes a pair of electrodes and an electrolyte interposed between the electrodes. Reactant gas flow fields for supplying reactant gases along surfaces of the electrodes are formed between the electrolyte electrode assembly and the separators. Reactant gas passages are connected to the reactant gas flow fields, and extending through the fuel cell in the stacking direction. A connection channel connecting the reactant gas passage and the reactant gas flow field is provided on the separator, and at least one gas diffusion layer of the electrolyte electrode assembly has an overlapping portion overlapped on the connection channel such that the overlapping portion is tightly attached on the separator for sealing the connection channel.

Advantageous Effects of the Invention

Therefore, since the gas diffusion layer itself covers the connection channel, no dedicated metal plates such as SUS plates are required. Thus, the operation of attaching the metal plates or the like is eliminated. The assembling operation of the fuel cell is simplified significantly. With the economical and simple structure, it is possible to achieve the desired sealing function. Further, it is possible to minimize the size of the connection channel, and to achieve reduction in the overall size and the weight of the fuel cell easily.

BEST MODE FOR CARRYING OUT THE INVENTION

Figure 1:
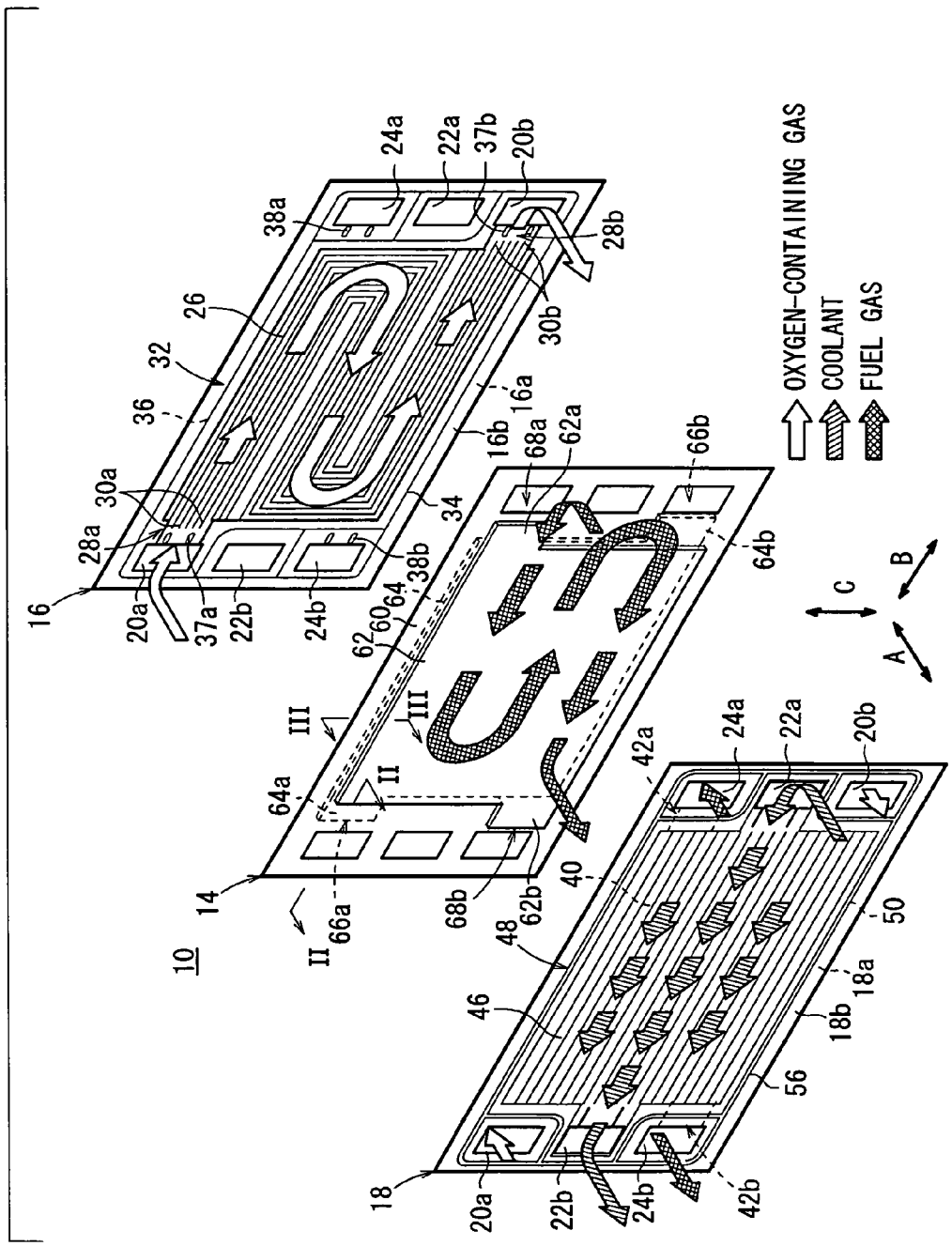
FIG. 1 is an exploded perspective view showing main components of a fuel cell according to a first embodiment of the present invention.
Figure 2:
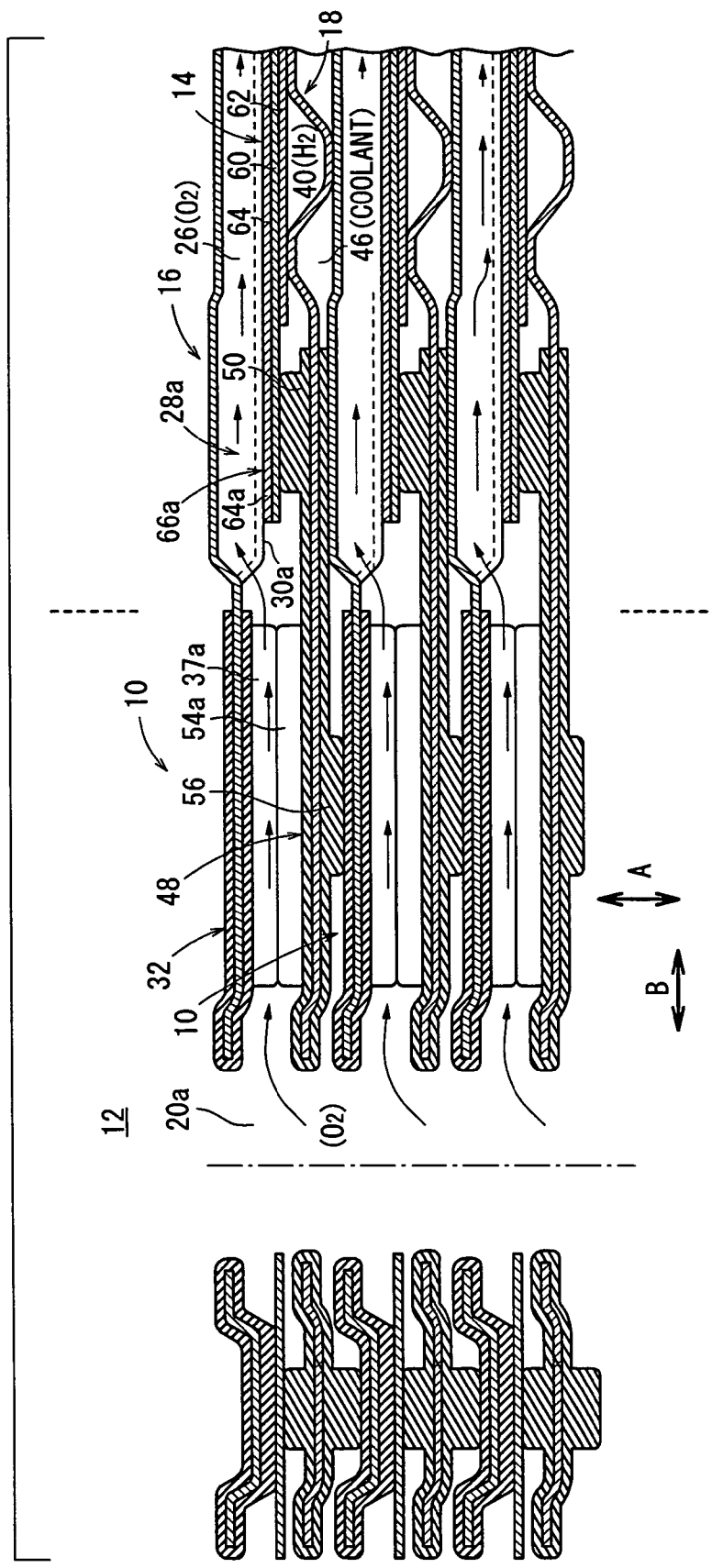
FIG. 2 is a cross sectional view showing a fuel cell stack, taken along a line II-II in FIG. 1.
Figure 3:
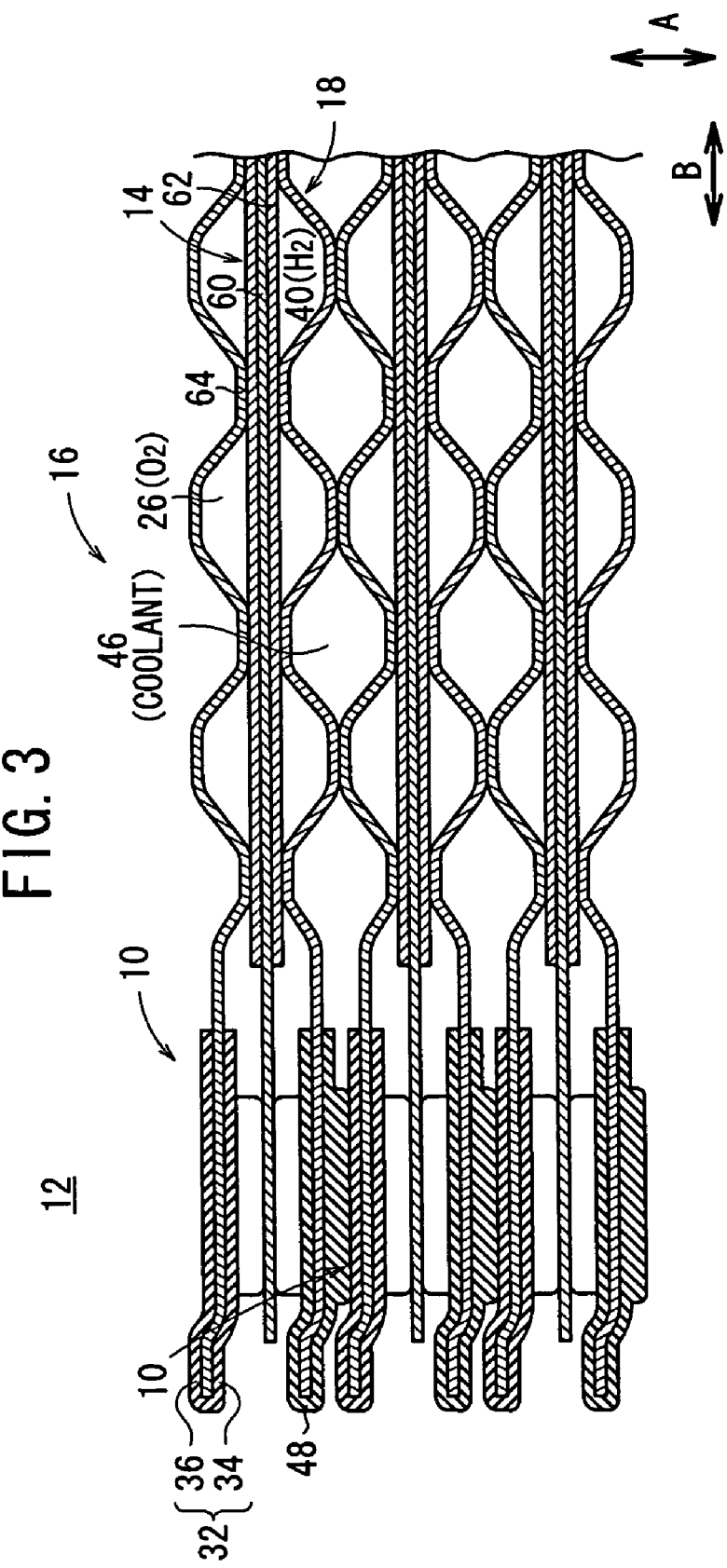
FIG. 3 is a cross sectional view showing the fuel cell stack, taken along a line III-III in FIG. 1.

FIG. 1 is an exploded perspective view showing main components of a fuel cell 10 according to a first embodiment of the present invention. FIG. 2 is a cross sectional view showing a fuel cell stack 12 formed by stacking a plurality of the fuel cells 10 in a direction indicated by an arrow A, taken along a line II-II in FIG. 1. FIG. 3 is a cross sectional view showing the fuel cell stack 12, taken along a line III-III in FIG. 1.

As shown in FIG. 1, the fuel cell 10 is formed by sandwiching a membrane electrode assembly (electrolyte electrode assembly) 14 between first and second metal separators 16, 18. For example, the first and second metal separators 16, 18 are steel plates, stainless steel plates, aluminum plates, or plated steel sheets. Instead of using the first and second metal separators 16, 18, for example, carbon separators may be used.

At one end of the fuel cell 10 in a horizontal direction indicated by an arrow B in FIG. 1, an oxygen-containing gas supply passage 20a for supplying an oxygen-containing gas or the like, a coolant discharge passage 22b for discharging a coolant, and a fuel gas discharge passage 24b for discharging a fuel gas such as a hydrogen containing gas are arranged vertically in a direction indicated by an arrow C. The oxygen-containing gas supply passage 20a, the coolant discharge passage 22b, and the fuel gas discharge passage 24b extend through the fuel cell 10 in the stacking direction indicated by the arrow A.

At the other end of the fuel cell 10 in the direction indicated by the arrow B, a fuel gas supply passage 24a for supplying the fuel gas, a coolant supply passage 22a for supplying the coolant, and the oxygen-containing gas discharge passage 20b for discharging the oxygen-containing gas are arranged in the direction indicated by the arrow C. The fuel gas supply passage 24a, the coolant supply passage 22a, and the oxygen-containing gas discharge passage 20b extend through the fuel cell 10 in the direction indicated by the arrow A.

Figure 4:
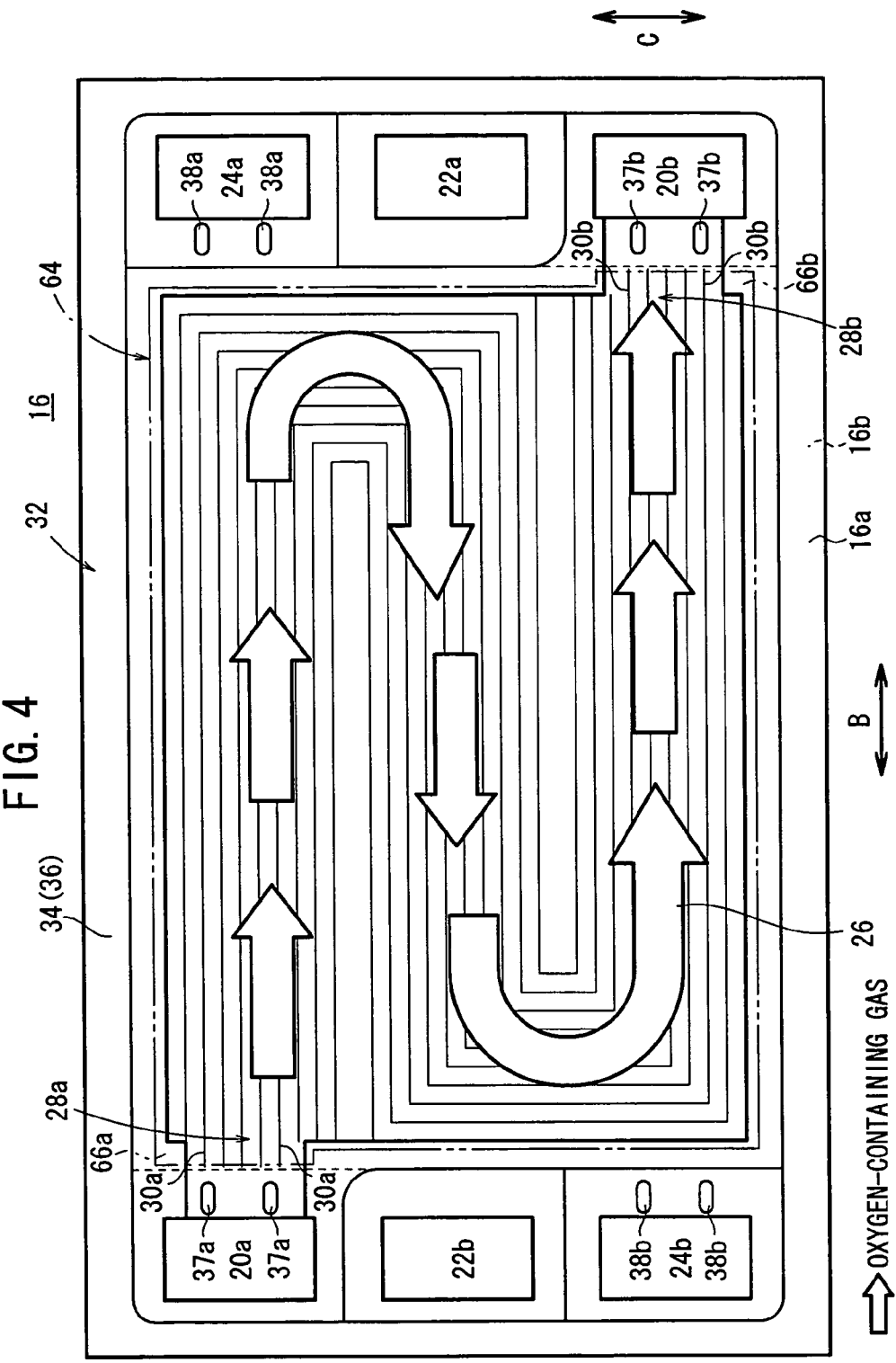
FIG. 4 is a front view showing a first metal separator of the fuel cell.

As shown in FIGS. 1 and 4, the first metal separator 16 has an oxygen-containing gas flow field (reactant gas flow field) 26 on a surface 16a facing the membrane electrode assembly 14. The oxygen-containing gas flow field 26 has a serpentine pattern including two turn regions and three straight regions for allowing the oxygen-containing gas to flow back and forth in the direction indicated by the arrow B. The oxygen-containing gas flow field 26 comprises a plurality of grooves formed by corrugating the first metal separator 16. The oxygen-containing gas flow field 26 is connected to the oxygen-containing gas supply passage 20a and the oxygen-containing gas discharge passage 20b through connection channels 28a, 28b. The connection channels 28a, 28b comprise a plurality of parallel flow grooves divided by a plurality of protrusions 30a, 30b extending from the oxygen-containing gas flow field 26.

A first seal member 32 is formed integrally on the surfaces 16a, 16b of the first metal separator 16, e.g., by heat treatment, injection molding or the like, around the outer end of the first metal separator 16. The first seal member 32 is made of seal material, cushion material or packing material such as EPDM (Ethylene Propylene Diene Monomer), NBR (Nitrile Butadiene Rubber), fluoro rubber, silicone rubber, fluoro silicone rubber, butyl rubber, natural rubber, styrene rubber, chloroprene rubber, or acrylic rubber.

The first seal member 32 includes a first planar portion 34 formed integrally on the surface 16a of the first metal separator 16, and a second planar portion 36 formed integrally on the surface 16b of the first metal separator 16. As shown in FIG. 4, the first planar portion 34 is formed around the oxygen-containing gas supply passage 20a, the oxygen-containing gas discharge passage 20b, and the oxygen-containing gas flow field 26, and allows the oxygen-containing gas to flow from the oxygen-containing gas supply passage 20a to the oxygen-containing flow field 26, and flow from the oxygen-containing gas flow field 26 to the oxygen-containing gas discharge passage 20b. The second planar portion 36 allows the coolant to flow from the coolant supply passage 22a to the coolant discharge passage 22b.

The first planar portion 34 includes two short ridges 37a near the oxygen-containing gas supply passage 20a, and two short ridges 37b near the oxygen-containing gas discharge passage 20b. Further, two short ridges 38a are formed near the fuel gas supply passage 24*a*, and two short ridges 38*b* are provided near the fuel gas discharge passage 24*b*.

Figure 5:
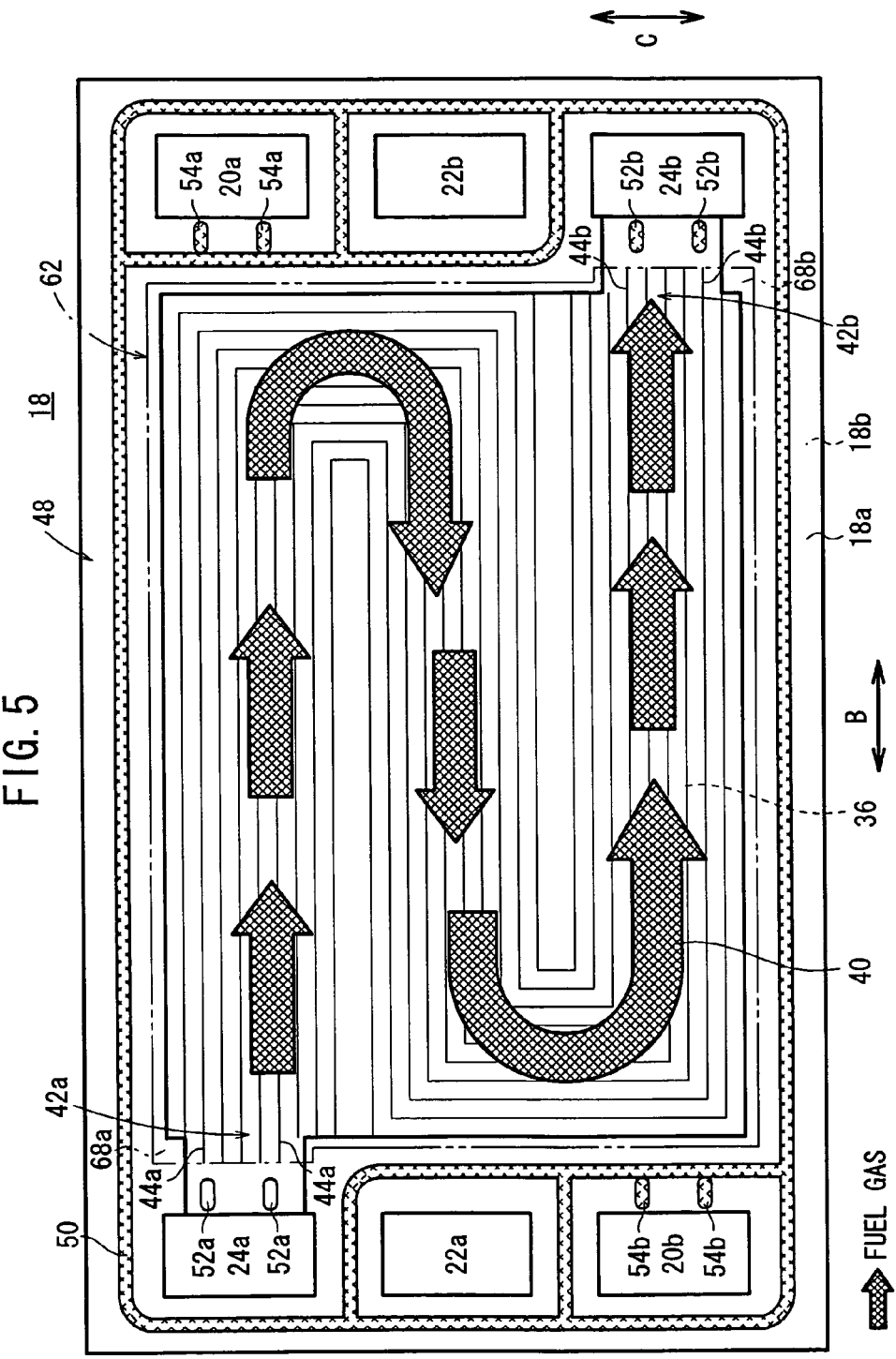
FIG. 5 is a front view showing a second metal separator of the fuel cell.

As shown in FIGS. 1 and 5, the second metal separator 18 has a fuel gas flow field (reactant gas flow field) 40 on a surface 18*a* facing the membrane electrode assembly 14. The fuel gas flow field 40 is connected to the fuel gas supply passage 24*a* and the fuel gas discharge passage 24*b*. The fuel gas flow field 40 has a serpentine pattern including two turn regions and three straight regions for allowing the fuel gas to flow back and forth in the direction indicated by the arrow B.

The fuel gas flow field 40 comprises a plurality of grooves. The fuel gas flow field 40 is connected to the fuel gas supply passage 24*a* and the fuel gas discharge passage 24*b* through connection channels 42*a*, 42*b*. The connection channels 42*a*, 42*b* comprise a plurality of parallel flow grooves divided by a plurality of protrusions 44*a*, 44*b* extending from the fuel gas flow field 40.

As shown in FIG. 1, the second metal separator 18 has a coolant flow field 46 on a surface 18*a* opposite to the surface 18*b*. The coolant flow field 46 is connected between the coolant supply passage 22*a* and the coolant discharge passage 22*b*.

A second seal member 48 is formed integrally on the surfaces 18*a*, 18*b* of the second metal separator 18 around the outer end of the second metal separator 18. The material of the second seal member 48 is the same as the material of the first seal member 32. As shown in FIG. 5, the second seal member 48 includes a ridge 50 on the surface 18*a* of the second metal separator 18. The ridge 50 is formed around the fuel gas flow field 40, and allows the fuel gas to flow from the fuel gas supply passage 24*a* to the fuel gas flow field 40, and flow from the fuel gas flow field 40 to the fuel gas discharge passage 24*b*.

On the surface 18*a*, two short ridges 52*a* are formed near the fuel gas supply passage 24*a*, and two short ridges 52*b* are formed near the fuel gas discharge passage 24*b*. Further, two short ridges 54*a* are formed near the oxygen-containing gas supply passage 20*a*, and two short ridges 54*b* are formed near the oxygen-containing gas discharge passage 20*b*. When the first metal separator 16 and the second metal separator 18 are stacked together, the short ridges 37*a*, 37*b* and the short ridges 54*a*, 54*b* tightly contact each other (see FIG. 2), and the short ridges 38*a*, 38*b* and the short ridges 52*a*, 52*b* tightly contact each other.

As shown in FIG. 1, on the surface 18*b*, the second seal member 48 includes a ridge 56 around the coolant flow field 46. The coolant flow field 46 allows the coolant to flow from the coolant supply passage 22*a* to the coolant flow field 46, and flow from the coolant flow field 46 to the coolant discharge passage 22*b*.

The membrane electrode assembly 14 includes an anode 62, a cathode 64, and a solid polymer electrolyte membrane 60 interposed between the anode 62 and the cathode 64. The solid polymer electrolyte membrane 60 is formed by impregnating a thin membrane of perfluorosulfonic acid with water, for example. The outer marginal portion of the solid polymer electrolyte membrane 60 protrudes outwardly from the outer marginal portions of the anode 62 and the cathode 64.

Each of the anode 62 and the cathode 64 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the anode 62 and the electrode catalyst layer of the cathode 64 are fixed to both surfaces of the solid polymer electrolyte membrane 60, respectively.

As shown in FIGS. 1, 4, and 5, the membrane electrode assembly 14 includes first overlapping portions 66*a*, 66*b* overlapped on the connection channels 28*a*, 28*b* of the first metal separator 16 for sealing the connection channels 28*a*, 28*b*, and second overlapping portions 68*a*, 68*b* overlapped on the connection channels 42*a*, 42*b* of the second metal separator 18 for sealing the connection channels 42*a*, 42*b*.

As shown in FIGS. 1 and 2, the first overlapping portion 66*a* has a protruded end 64*a* protruding from the end of the cathode 64 toward the connection channel 28*a* (outwardly in the direction indicated by the arrow B) in parallel to the surface of the cathode 64. The protruded end 64*a* is supported by the ridge 50 of the second seal member 48 of the second metal separator 18 such that the solid polymer electrolyte membrane 60 is interposed between the protruded end 64*a* and the ridge 50.

Likewise, the first overlapping portion 66*b* has a protruded end 64*b* protruding from the end of the cathode 64 toward the connection channel 28*b* in parallel to the surface of the cathode 64. The protruded end 64*b* is supported by the ridge 50 of the second seal member 48 such that the solid polymer electrolyte membrane 60 is interposed between the protruded end 64*b* and the ridge 50. The protruded ends 64*a*, 64*b* are provided symmetrically at the gas diffusion layer of the cathode 64.

The protruded ends 64*a*, 64*b* tightly contact the protrusions 30*a*, 30*b* of the first metal separator 16 for sealing the connection channels 28*a*, 28*b* each comprising a plurality of flow grooves. The oxygen-containing gas supply passage 20*a* and the oxygen-containing gas discharge passage 20*b* are connected to the oxygen-containing gas flow field 26 through the connection channels 28*a*, 28*b*.

The second overlapping portions 68*a*, 68*b* have protruded ends 62*a*, 62*b* protruding from the ends of the anode 62 toward the connection channels 42*a*, 42*b* of the second metal separator 18 in parallel to the surface of the anode 62. The protruded ends 62*a*, 62*b* tightly contact the protrusions 44*a*, 44*b* of the second metal separator. The protruded ends 62*a*, 62*b* are provided symmetrically at the gas diffusion layer of the anode 62.

The protruded ends 62*a*, 62*b* seal the connection channels 42*a*, 42*b*. The fuel gas supply passage 24*a* and the fuel gas discharge passage 24*b* are connected to the fuel gas flow field 40 through the connection channels 42*a*, 42*b*.

Operation of the fuel cell 10 as having the above structure will be described below.

Firstly, as shown in FIG. 1, a fuel gas such as a hydrogen-containing gas is supplied to the fuel gas supply passage 24*a*, and an oxygen-containing gas or the like is supplied to the oxygen-containing gas supply passage 20*a*. Further, and a coolant such as pure water, ethylene glycol, or oil is supplied to the coolant supply passage 22*a*.

Thus, as shown in FIG. 5, the fuel gas flows from the fuel gas supply passage 24*a* to the fuel gas flow field 40 of the second metal separator 18, and flows back and forth in the direction indicated by the arrow B. The fuel gas is supplied to the anode 62 of the membrane electrode assembly 14. As shown in FIGS. 1 and 4, the oxygen-containing gas flows from the oxygen-containing gas supply passage 20*a* to the oxygen-containing gas flow field 26 of the first metal separator 16, and flows back and forth in the direction indicated by the arrow B. The oxygen-containing gas is supplied to the cathode 64 of the membrane electrode assembly 14.

Thus, in the membrane electrode assembly 14, the oxygen-containing gas supplied to the cathode 64, and the fuel gas supplied to the anode 62 are consumed in the electrochemical reactions at catalyst layers of the cathode 64 and the anode 62 for generating electricity.

Then, the fuel gas supplied to, and consumed at the anode 62 is discharged through the fuel gas discharge passage 24b in the direction indicated by the arrow A. Likewise, the oxygen-containing gas supplied to, and consumed at the cathode 64 is discharged through the oxygen-containing gas discharge passage 20b in the direction indicated by the arrow A.

Further, the coolant supplied to the coolant supply passage 22a flows into the coolant flow field 46 between the first and second metal separators 16, 18, and flows in the direction indicated by the arrow B. After the coolant cools the membrane electrode assembly 14, the coolant is discharged through the coolant discharge passage 22b.

In the first embodiment, the first overlapping portions 66a, 66b and the second overlapping portions 68a, 68b are provided at, at least, part of the membrane electrode assembly 14. The first overlapping portions 66a, 66b are overlapped on the connection channels 28a, 28b of the first metal separator 16 for sealing the connection channels 28a, 28b. The second overlapping portions 68a, 68b are overlapped on the connection channels 42a, 42b of the second metal separator 18 for sealing the connection channels 42a, 42b.

Thus, as shown in FIG. 2, at the first overlapping portion 66a, the solid polymer electrolyte membrane 60 tightly contacts the ridge 50 of the second seal member 48, and the protruded end 64a which is, in effect, the gas diffusion layer tightly contacts the protrusions 30a of the first metal separator 16. The oxygen-containing gas supplied to the oxygen-containing gas supply passage 20a flows toward the connection channel 28a along the short ridges 37a, 54a which tightly contact each other. Then, the oxygen-containing gas flows smoothly between the protrusions 30a in the oxygen-containing gas flow field 26. Thus, it is possible to effectively prevent the leakage of the oxygen-containing gas.

Therefore, no dedicated metal plate such as the conventional SUS plate is required for covering the connection channel 28a. The operation of attaching the metal plate is eliminated. Thus, the assembling operation of the fuel cell 10 is simplified significantly. With the economical and simple structure, it is possible to achieve the desired sealing function.

Further, it is possible to minimize the size of the connection channel 28a, and to achieve reduction in the overall size and the weight of the fuel cell 10. Also in the connection channels 28b, 42a, 42b, the same advantages as in the case of the connection channel 28a can be obtained.

Figure 6:
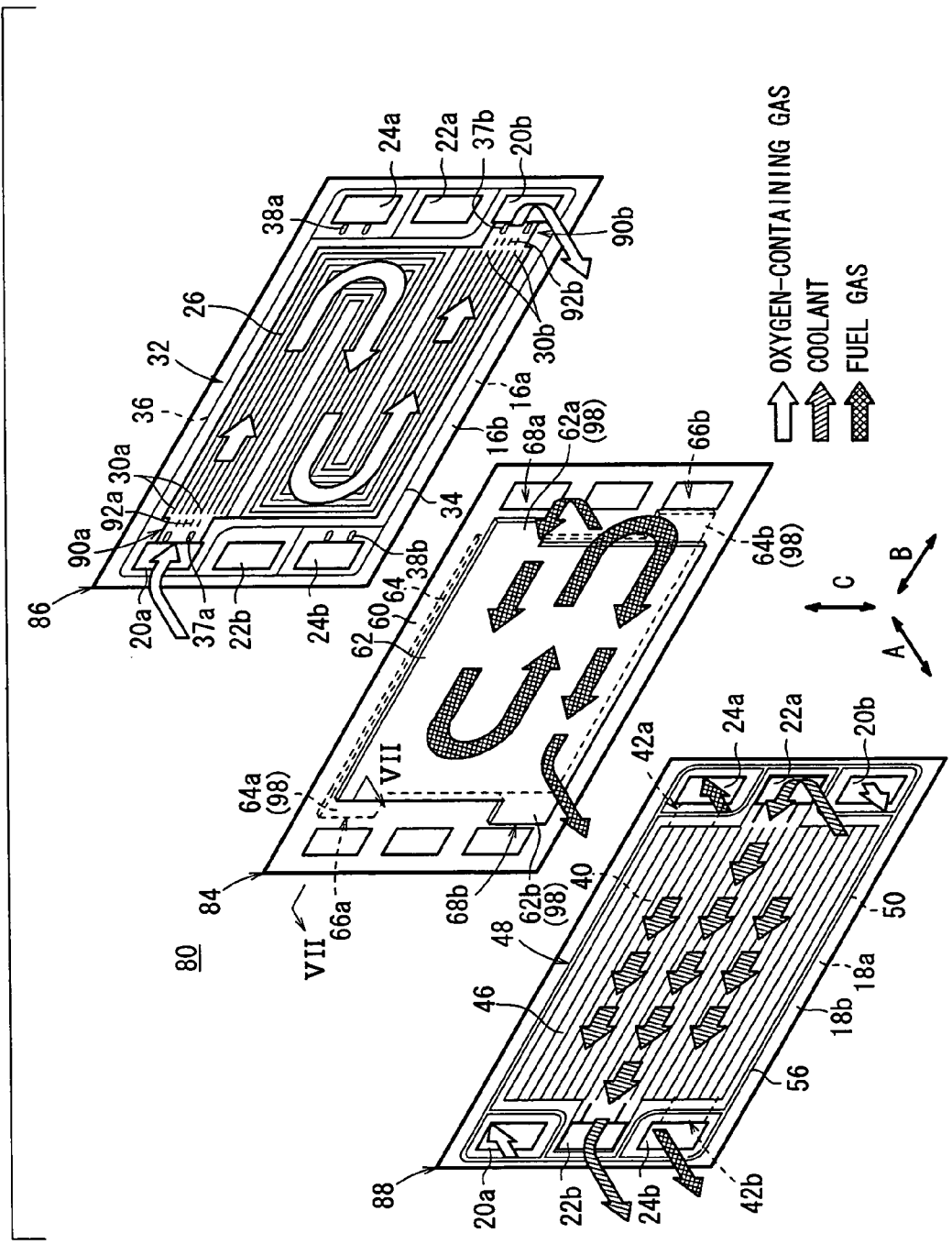
FIG. 6 is an exploded perspective view showing main components of a fuel cell according to a second embodiment of the present invention.
Figure 7:
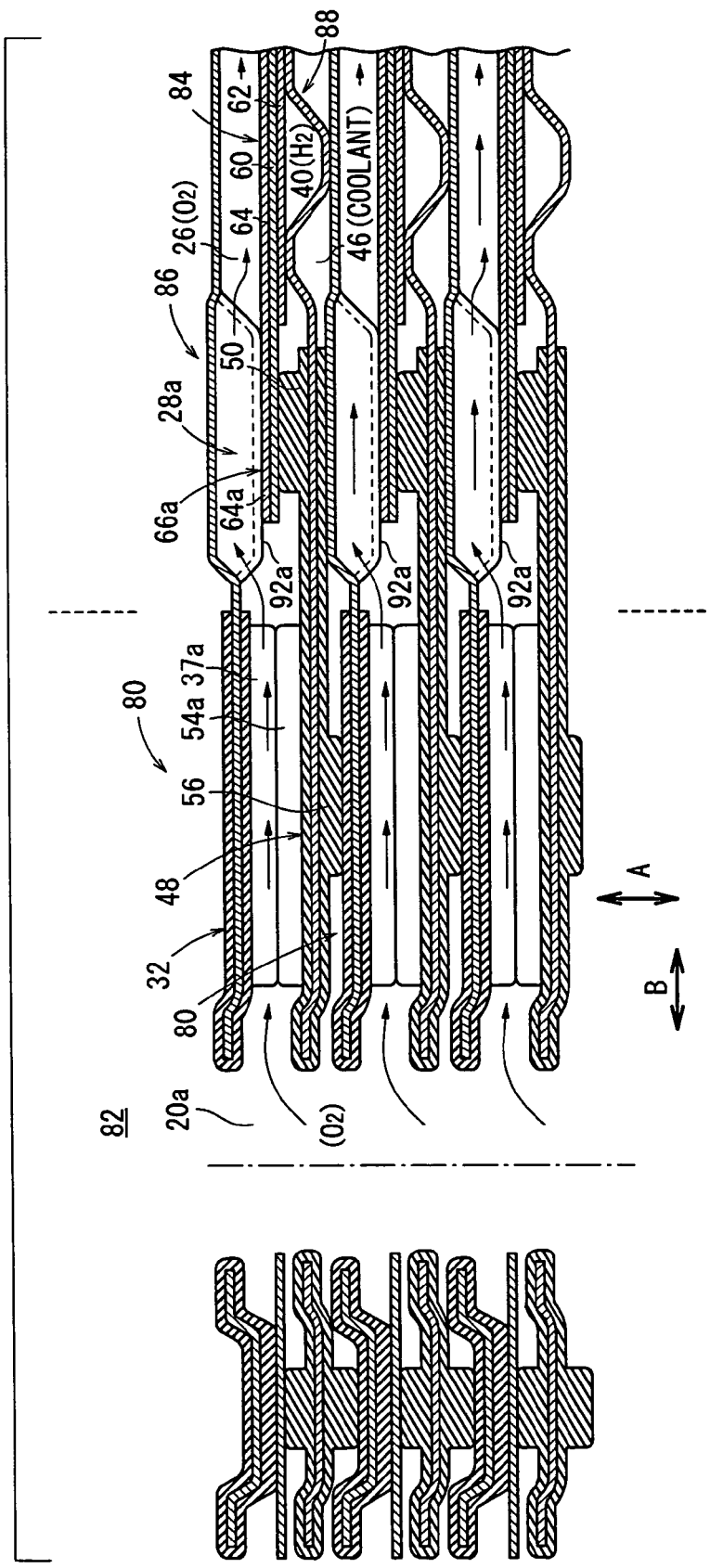
FIG. 7 is a cross sectional view showing a fuel cell stack, taken along a line VII-VII in FIG. 6.

FIG. 6 is an exploded perspective view showing main components of a fuel cell 80 according to a second embodiment of the present invention. FIG. 7 is a cross sectional view showing a fuel cell stack 82 formed by stacking a plurality of the fuel cells 80 in the direction indicated by the arrow A, taken along a line VII-VII in FIG. 6. The constituent elements that are identical to those of the fuel cell 10 according to the first embodiment are labeled with the same reference numeral, and description thereof will be omitted. In a third embodiment as described later, the constituent elements that are identical to those of the fuel cell 10 according to the first embodiment are labeled with the same reference numeral, and description thereof will be omitted.

Figure 8:
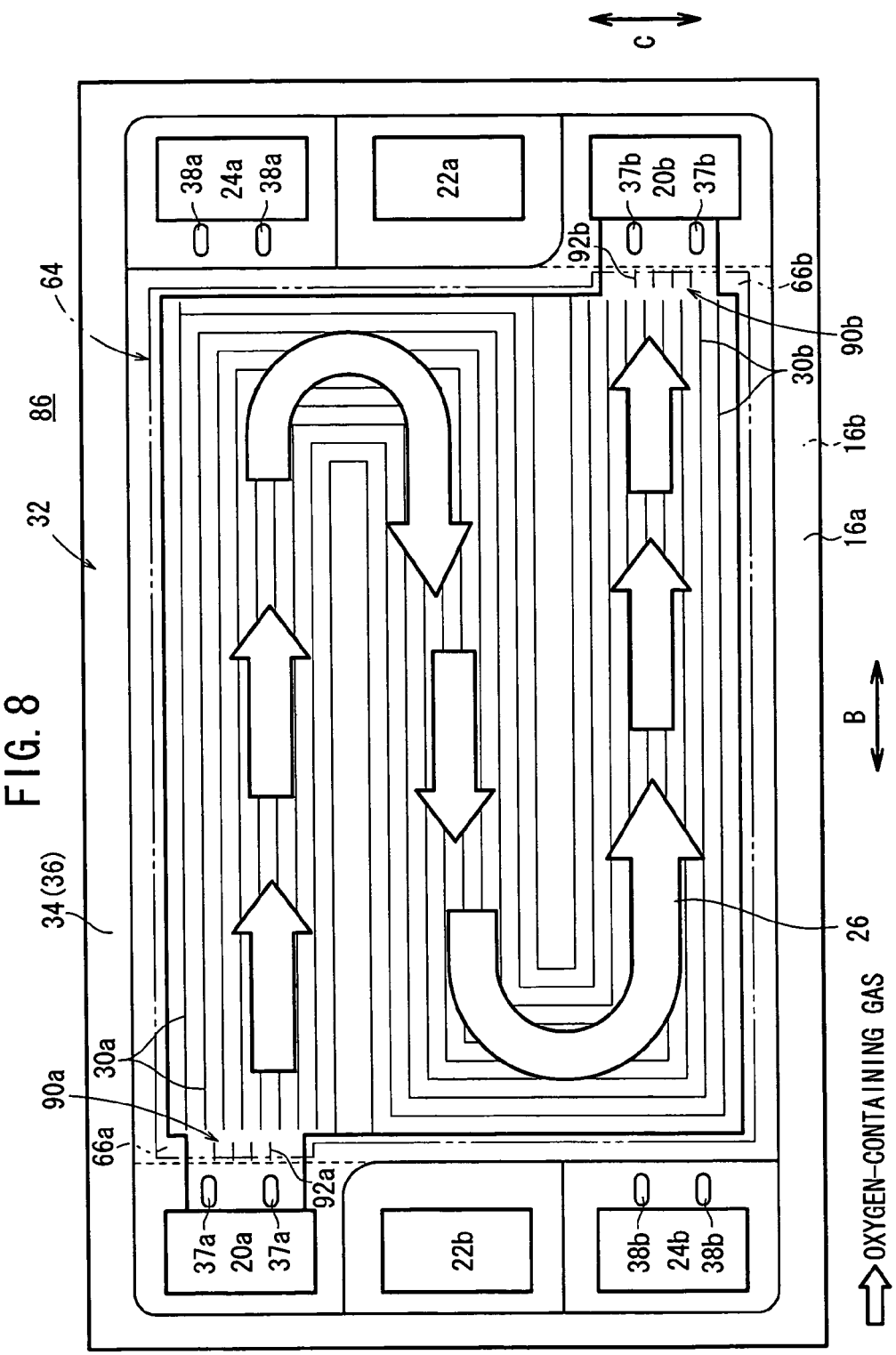
FIG. 8 is a front view showing a first metal separator of the fuel cell.

The fuel cell 80 includes a membrane electrode assembly (electrolyte electrode assembly) 84 sandwiched between first and second metal separators 86, 88. As shown in FIGS. 6 and 8, the oxygen-containing gas flow field 26 is connected to the oxygen-containing gas supply passage 20a and the oxygen-containing gas discharge passage 20b through connection channels 90a, 90b. The connection channels 90a, 90b comprise a plurality of parallel flow grooves divided by a plurality of protrusions 92a, 92b provided separately from protrusions 30a, 30b extending from the oxygen-containing gas flow field 26.

Figure 9:
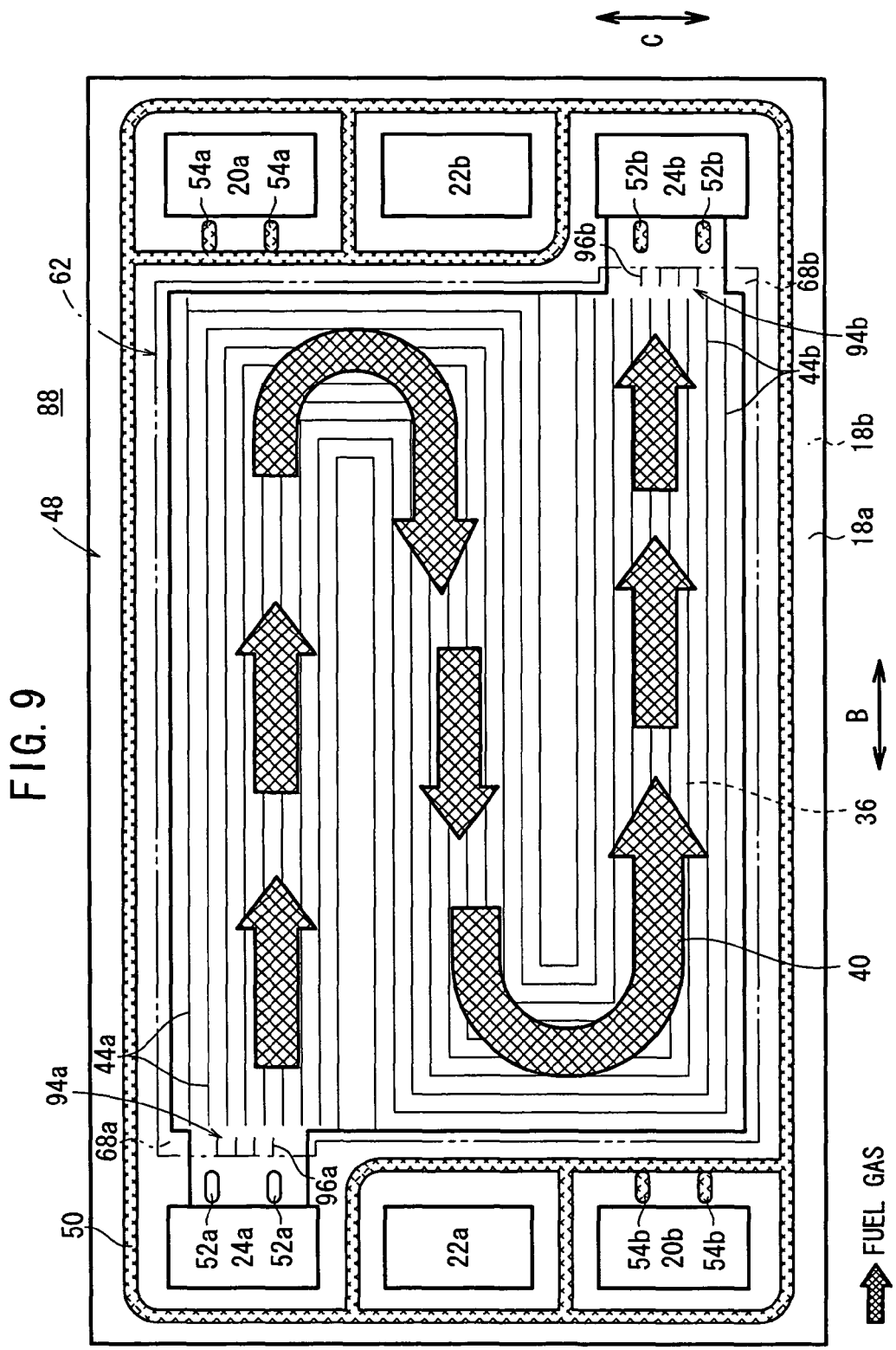
FIG. 9 is a front view showing a second metal separator of the fuel cell.

As shown in FIG. 9, in the second metal separator 88, the fuel gas flow field 40 is connected to the fuel gas supply passage 24a and the fuel gas discharge passage 24b through the connection channels 94a, 94b. The connection channels 94a, 94b comprise a plurality of parallel flow grooves divided by a plurality of protrusions 96a, 96b provided separately from protrusions 44a, 44b extending from the fuel gas flow field 40.

As shown in FIG. 6, a hardened portion 98 formed by impregnation of adhesive such as fluorinated adhesive is provided at each of the protruded ends 62a, 62b, 64a, and 64b. Therefore, when the membrane electrode assembly 84 is sandwiched between the first and second separators 86, 88, the protruded ends 62a, 62b, 64a, and 64b are not fatigued.

Thus, in the second embodiment, the gas diffusion layer is not positioned in the connection channels 90a, 90b, 94a, and 94b, and the desired sealing performance can be maintained. Further, in the second embodiment, the same advantages as in the case of the first embodiment can be obtained.

Figure 10:
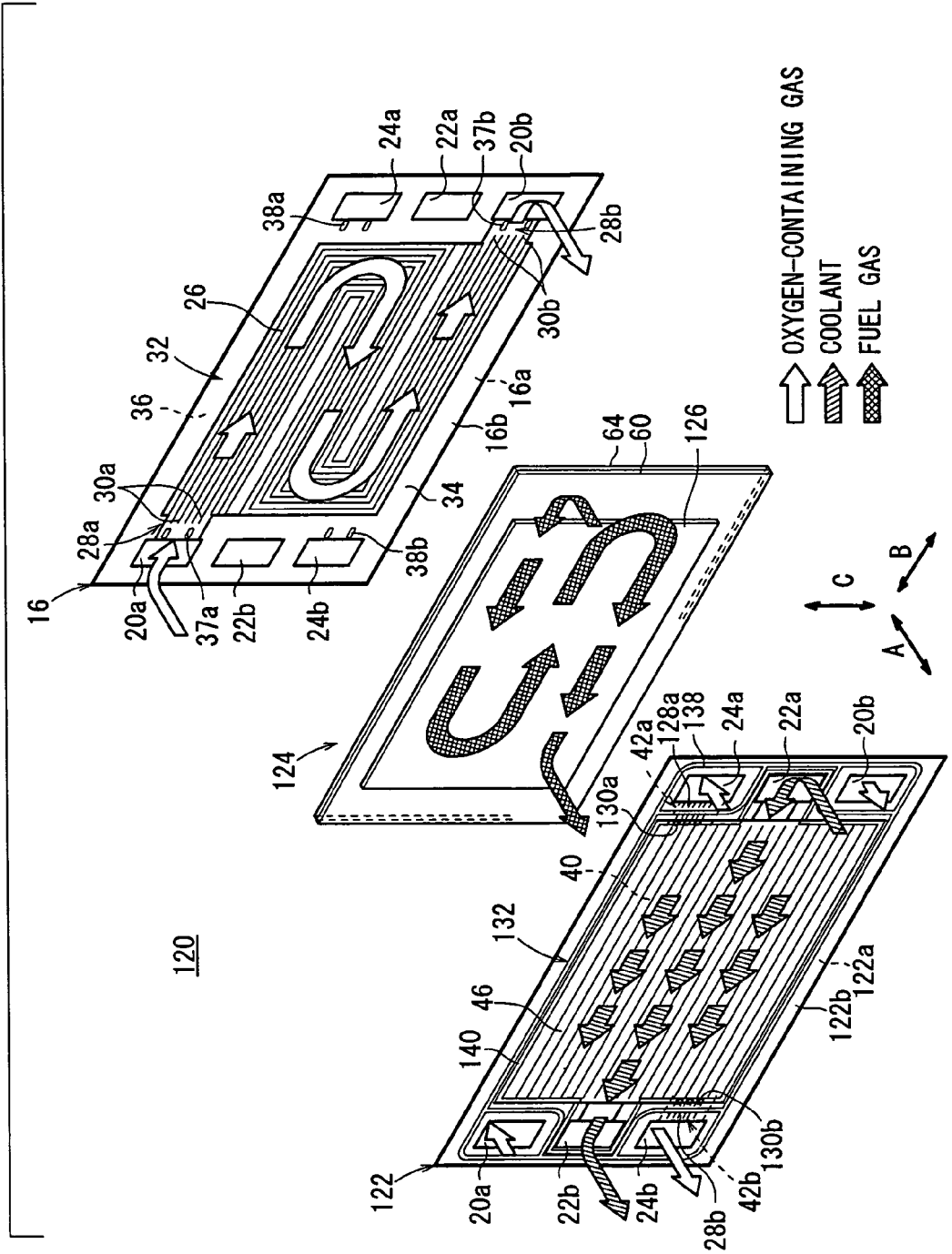
FIG. 10 is an exploded perspective view showing main components of a fuel cell according to a third embodiment of the present invention.
Figure 11:
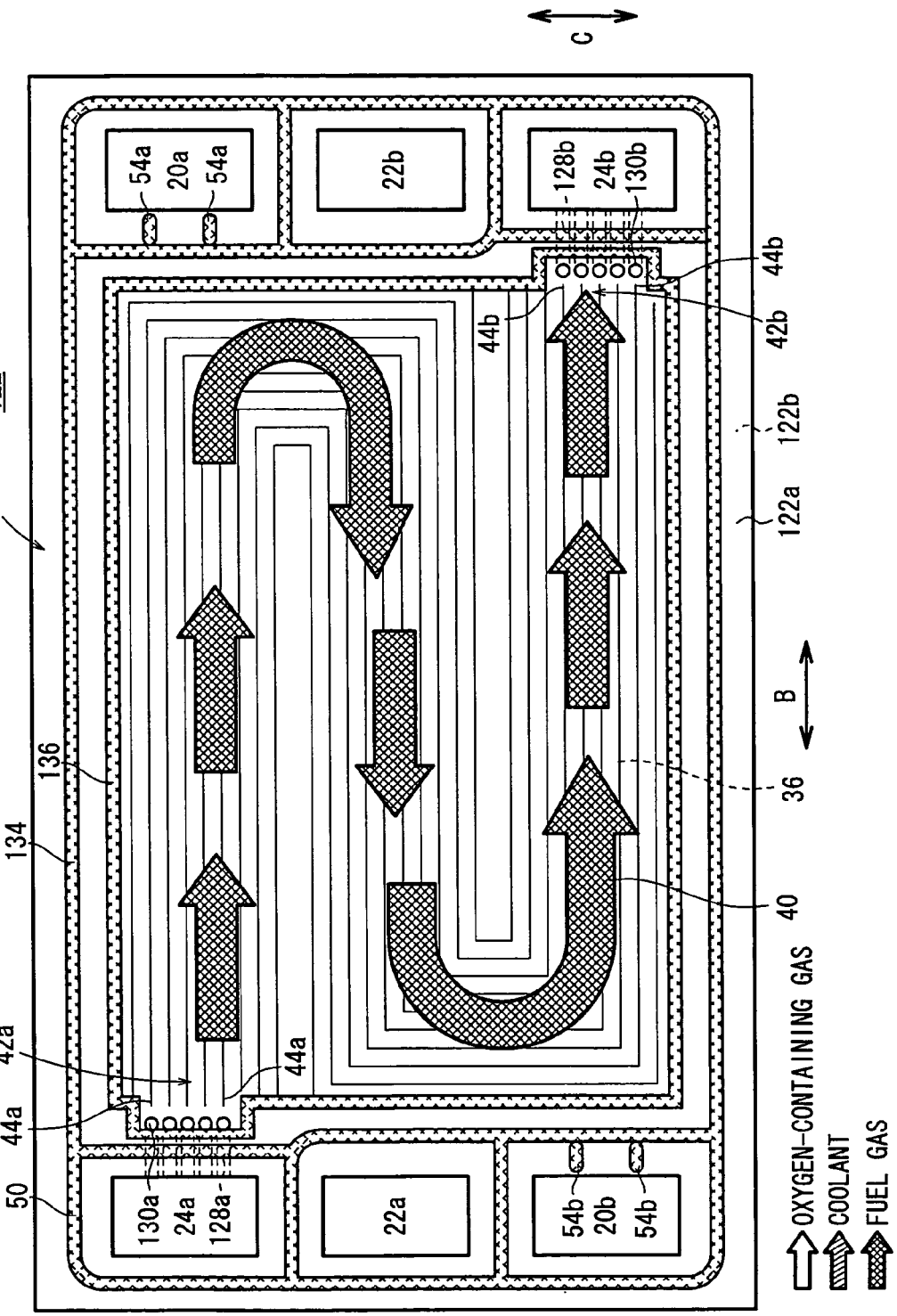
FIG. 11 is a front view showing a second metal separator of the fuel cell.

FIG. 10 is an exploded perspective view showing main components of a fuel cell 120 according to a third embodiment of the present invention. FIG. 11 is a front view showing a second metal separator 122 of the fuel cell 120.

The fuel cell 120 has a membrane electrode assembly 124 including an anode 126, a cathode 64, and a solid polymer electrolyte membrane 60 interposed between the anode 126 and the cathode 64. The size of the anode 126 is smaller than the size of the cathode 64.

The second metal separator 122 does not have any connection channels. The second metal separator 122 has a plurality of passages 128a, 128b on a surface 122b where the coolant flow field 46 is provided. The passages 128a, 128b are connected to the fuel gas supply passage 24a and the fuel gas discharge passage 24b, respectively. Also, the passages 128a, 128b are connected to a plurality of holes 130a, 130b, respectively. The holes 130a, 130b are connected to the fuel gas flow field 40 on a surface 122a.

A second seal member 132 is formed integrally on the surfaces 122a, 122b of the second metal separator 122. As shown in FIG. 11, the second seal member 132 includes an outer seal 134 provided on the surface 122a near the outer end of the second metal separator 122, and an inner seal 136 spaced inwardly from the outer seal 134 at a predetermined distance. The inner seal 136 seals the fuel gas flow field 40.

Figure 12:
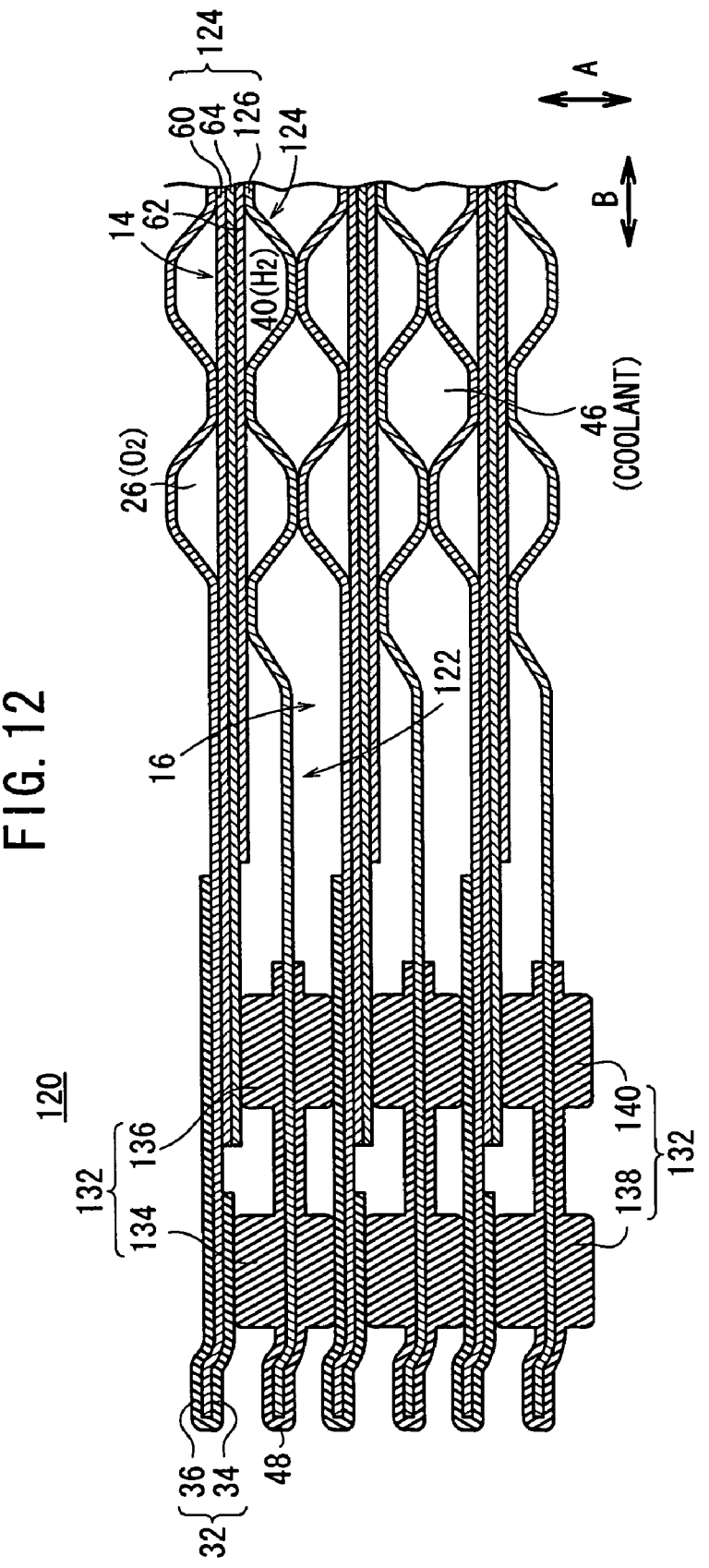
FIG. 12 is a cross sectional view showing part of the fuel cell stack.
Figure 13:
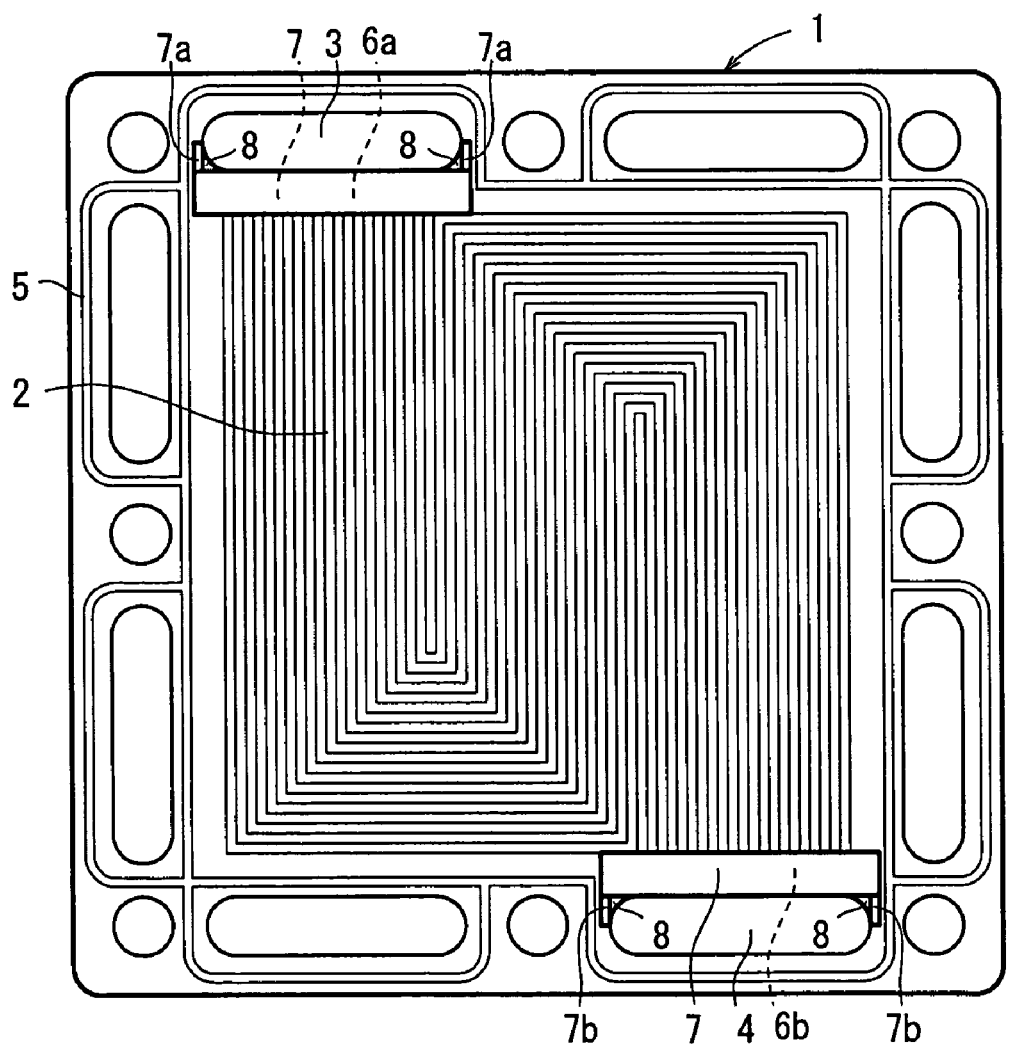
FIG. 13 is a front view showing a separator of a conventional fuel cell stack.

The second seal member 132 includes an outer seal 138 provided on the surface 122b of the second metal separator 122, and an inner seal 140 spaced inwardly from the outer seal 138 around the coolant flow field 46 (see FIGS. 10 and 12).

In the third embodiment having the above structure, the connection channels 28a, 28b of the first metal separator 16 are sealed by the two corners of the cathode 64 (which is, in effect, the gas diffusion layer) of the membrane electrode assembly 124. Therefore, the same advantages as in the cases of the first and second embodiments can be obtained.

Industrial Applicability

In the fuel cell according to the present invention, the gas diffusion layer of the electrolyte electrode assembly itself covers the connection channel. Therefore, no dedicated metal plate or the like is required. Thus, the operation of attaching the metal plate or the like is eliminated. The assembling operation of the fuel cell is simplified significantly. With the simple and economical structure, the desired sealing performance can be achieved. Further, the size of the connection channel is reduced as much as possible. It is possible to achieve reduction in the size and the weight of the fuel cell easily.

The invention claimed is:

1. An internal manifold type fuel cell formed by stacking an electrolyte electrode assembly and separators in a stacking direction, said electrolyte electrode assembly including a pair of electrodes and an electrolyte interposed between said electrodes, reactant gas flow fields for supplying reactant gases along surfaces of said electrodes being formed between said electrolyte electrode assembly and said separators, reactant gas passages being connected to said reactant gas flow fields and extending through said fuel cell in the stacking direction, wherein said separator is a metal plate formed to have a corrugated shape, said reactant gas flow fields comprise at least a first reactant gas flow field and said reactant gas passages comprise a first reactant gas passage, said electrolyte electrode assembly comprises at least a first gas diffusion layer having a main portion and an overlapping portion, said main portion covering said first reactant gas flow field, a connection channel connecting said first reactant gas passage and said first reactant gas flow field is provided between the corrugated metal plate and the overlapping portion, said overlapping portion of said first gas diffusion layer having a flat surface and a protruding end extending from said main portion wherein the overlapping portion extends from the main portion, wherein at said protruded end, an electrolyte membrane as said electrolyte is interposed between said protruded end and a seal member, said seal member facing a surface of said protruded end opposite to a surface overlapped on said connection channel, said overlapping portion covering said connection channel such that an entire width of the overlapping portion is substantially the same as a width of the first reactant gas passage, the width direction extending along a side of the separator plate that comprises a plurality of the reactant gas passages from one end of the side to the other end of the side in a width direction of the separator plate, and said first overlapping portion being tightly attached on said separator for sealing said connection channel.

2. A fuel cell according to claim 1, wherein a plurality of said protruded ends are provided symmetrically at said first gas diffusion layer.

3. A fuel cell according to claim 1, wherein said electrolyte electrode assembly further comprises a second gas diffusion layer, and a surface area of the first gas diffusion layer is larger than a surface area of the second gas diffusion layer.

4. A fuel cell according to claim 3, wherein the first gas diffusion layer covers the entire surface of an electrolyte membrane as said electrolyte.

5. A fuel cell according to claim 4, wherein a seal member is stacked on said electrolyte membrane around the second gas diffusion layer.

6. A fuel cell according to claim 1, wherein said connection channel comprises a plurality of parallel flow grooves.

7. A fuel cell according to claim 1, wherein said first gas diffusion layer has a hardened portion provided by adhesive at said first overlapping portion overlapped on said connection channel.

8. A fuel cell according to claim 1, wherein a plurality of said protruded ends are provided symmetrically at said first gas diffusion layer.

* * * * *